United States Patent
Tseng

(10) Patent No.: US 9,279,948 B2
(45) Date of Patent: Mar. 8, 2016

(54) OPTICAL COMMUNICATION DEVICE

(71) Applicant: HON HAI PRECISION INDUSTRY CO., LTD., New Taipei (TW)

(72) Inventor: Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 301 days.

(21) Appl. No.: 14/035,960

(22) Filed: Sep. 25, 2013

(65) Prior Publication Data
US 2014/0308012 A1    Oct. 16, 2014

(30) Foreign Application Priority Data

Apr. 10, 2013    (TW) .............................. 102112599 A

(51) Int. Cl.
*G02B 6/36*          (2006.01)
*G02B 6/42*          (2006.01)

(52) U.S. Cl.
CPC ............ *G02B 6/4231* (2013.01); *G02B 6/4246* (2013.01); *G02B 6/4214* (2013.01)

(58) Field of Classification Search
CPC ... G02B 6/3644; G02B 6/4219; G02B 6/4231
See application file for complete search history.

(56) References Cited

U.S. PATENT DOCUMENTS 7,512,305 B2 *   3/2009   Zheng .................. G02B 6/3616
                                                                           385/136
2009/0092357 A1 *   4/2009   Ozawa .................. G02B 6/4214
                                                                            385/31

* cited by examiner

*Primary Examiner* — Uyen Chau N Le
*Assistant Examiner* — Chad Smith
(74) *Attorney, Agent, or Firm* — Novak Druce Connolly Bove + Quigg LLP

(57) ABSTRACT

An optical communication device includes a substrate, a first optical-electric element, a second optical-electric element, a planar optical waveguide and a fixing device. Both the first and the second optical-electric elements are positioned on the substrate. The first optical-electric element includes a light emitting surface. The second optical-electric element includes a light receiving surface. The planar optical waveguide includes a first reflecting surface and a second reflecting surface. The fixing device includes a fixing pole and a fixing ring. The fixing pole defines a through hole. The planar optical waveguide runs through the through hole and is coiled by the fixing ring. The fixing ring is fixed on the fixing pole. The planar optical waveguide is positioned above the first and the second optical-electric elements, with the first reflecting surface aligning with the light emitting surface, and the second reflecting surface aligning with the light receiving surface.

18 Claims, 1 Drawing Sheet

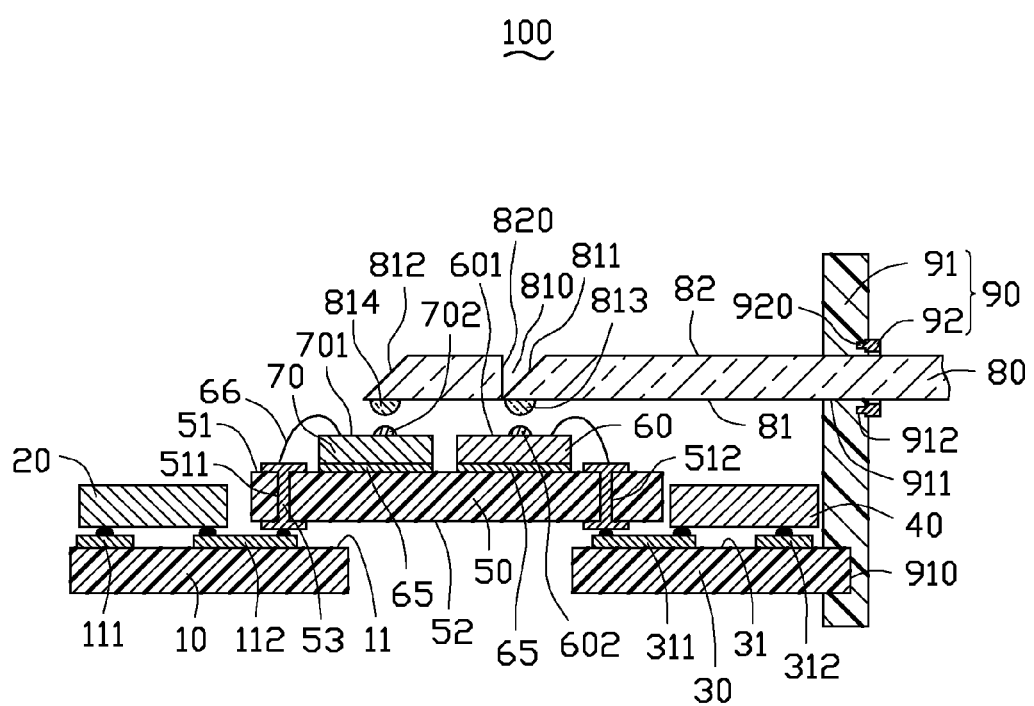

OPTICAL COMMUNICATION DEVICE

BACKGROUND

1. Technical Field

The present disclosure relates to an optical communication device.

2. Description of Related Art

An optical communication device includes a photoelectric element for emitting/receiving optical signals, a driver chip for driving the photoelectric element, a planar light waveguide for transmitting optical signals, and a lens element for optically coupling the photoelectric element with the light waveguide. To ensure an optical transmitting efficiency of the optical communication device, the photoelectric element and the light waveguide need to be accurately aligned with the lens element. However, a complicated alignment mechanism and method is needed to align the photoelectric element and the light waveguide with the lens element, which increases a cost and assembling difficulty of the optical communication device.

Therefore, it is desirable to provide an optical communication device which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

The FIGURE is a schematic view of an optical communication device, according to an exemplary embodiment of the present disclosure.

DETAILED DESCRIPTION

The FIGURE shows an optical communication device 100, according to an exemplary embodiment. The optical communication device 100 includes a first substrate 10, a first chip driver 20, a second substrate 30, a second chip driver 40, a third substrate 50, a first optical-electric element 60, a second optical-electric element 70, a planar optical waveguide 80, and a fixing device 90.

The first substrate 10 is made of a material such as polyimide, ceramic, or glass fiber. The first substrate 10 includes a first mounting surface 11. The first substrate 10 also includes a first connection pad 111 and a second connection pad 112. Both the first connection pad 111 and the second connection pad 112 are formed on the first mounting surface 11.

The first chip driver 20 is electrically connected to the first connection pad 111 and the second connection pad 112 through a flip chip method.

The second substrate 30 is also made of a material such as polyimide, ceramic, or glass fiber. The second substrate 30 includes a second mounting surface 31. The second substrate 30 also includes a third connection pad 311 and a fourth connection pad 312. Both the third connection pad 311 and the fourth connection pad 312 are formed on the second mounting surface 31. The second substrate 30 and the first substrate 10 are spaced from each other.

The second chip driver 40 is electrically connected to the third connection pad 311 and the fourth connection pad 312 also through a flip chip method.

The third substrate 50 is also made of a material such as polyimide, ceramic, or glass fiber. The third substrate 50 includes a first surface 51 and a second surface 52 facing away from the first surface 51. The second surface 52 is positioned over the first mounting surface 11 and the second mounting surface 31. In particular, the second surface 52 is mounted on the second connection pad 112 and the third connection pad 311. The third substrate 50 defines a first through hole 511 and a second through hole 512. Both the first through hole 511 and the second through hole 512 run through the first surface 51 and the second surface 52.

Both the first through hole 511 and the second through hole 512 are all filled with a conductive element 53. One end of the conductive element 53 received in the first through hole 511 is electrically connected to the second connection pad 112. One end of the conductive element 53 received in the second through hole 512 is electrically connected to the third connection pad 311.

In the embodiment, the first optical-electric element 60 is a laser diode (LD). The first optical-electric element 60 includes a light emitting surface 601 and a first light condensing lens 602 formed on the light emitting surface 601. In the embodiment, the first light condensing lens 602 is a convex lens. The first optical-electric element 60 is positioned on the first surface 51 with a heat dissipating adhesive 65. In the embodiment, the heat dissipating adhesive 65 is a silver adhesive. The first optical-electric element 60 is electrically connected to the other end of the conductive element 53 received in the second through hole 512 with a connection line 66, as such, the first optical-electric element 60 is electrically connected to the second chip driver 40 through the conductive element 53 received in the second through hole 512 and the third connection pad 311.

In the embodiment, the second optical-electric element 70 is a photo diode (PD). The second optical-electric element 70 includes a light receiving surface 701 and a second light condensing lens 702 formed on the light receiving surface 701. In the embodiment, the second light condensing lens 702 is also a convex lens, an angle between an optical axis of the second light condensing lens 702 and the second reflecting surface 814 is about 45 degrees. The second optical-electric element 70 is positioned on the first surface 51 also with the heat dissipating adhesive 65. The second optical-electric element 70 is electrically connected to the other end of the conductive element 53 received in the first through hole 511 with a connection line 66, as such, the second optical-electric element 70 is electrically connected to the first chip driver 20 through the conductive element 53 received in the first through hole 511 and the second connection pad 112.

The fixing device 90 includes a fixing pole 91 and a fixing ring 92. The fixing pole 91 defines a receiving cavity 910 spatially corresponding to the second substrate 30. As such, when assembling, an end of the second substrate 30 is inserted into the receiving cavity 910 as a pinch fit to firmly attach the second substrate 30 to the fixing pole 91.

The fixing pole 91 defines a through hole 911 and two locating holes 912. The two locating holes 912 are symmetrical about the through hole 911. The fixing ring 92 includes two locating post 920 spatially corresponding to the two locating holes 912. When assembling, the planar optical waveguide 80 runs through the though hole 911 and is coiled by fixing ring 92, each locating post 920 is inserted into a locating hole 912 to assemble the fixing ring 92 onto the fixing pole 91, to fix the planar optical waveguide 80 to the fixing device 90. As such, the planar optical waveguide 80 is positioned over the first optical-electric element 60 and the second optical-electric element 70.

The planar optical waveguide 80 includes a bottom surface 81 facing both the first and the second optical-electric elements 70, 80, and a top surface 82 facing away from the bottom surface 81. The top surface 82 defines a cavity 810. The cavity 810 includes a vertical surface 820 substantially perpendicular to the top surface 82, and a first reflecting surface 811 directly connected to the vertical surface 820. In the embodiment, an included angle between the first reflecting surface 811 and the vertical surface 820 is about 45 degrees. An included angle between the first reflecting surface 811 and the bottom surface 81 is also about 45 degrees. The first reflecting surface 811 aligns with the first light condensing lens 602. An angle between an optical axis of the first light condensing lens 602 and the first reflecting surface 811 is about 45 degrees.

The planar optical waveguide 80 also includes a second reflecting surface 812 aligning with the second light condensing lens 702. An included angle between the second reflecting surface 812 and the bottom surface 81 is also about 45 degrees, as such, the second reflecting surface 812 is substantially parallel to the first reflecting surface 811. An optical axis of the second light condensing lens 702 and the second reflecting surface 812 is also about 45 degrees.

For improving light coupling efficiency, the bottom surface 81 forms a third light condensing lens 813 spatially corresponding to the first light condensing lens 602, and a fourth light condensing lens 814 spatially corresponding to the second light condensing lens 702. Both the third light condensing lens 813 and the fourth light condensing lens 814 are convex lenses.

In use, the second chip driver 40 sends a driving signal to drive the first optical-electric element 60 to emit light beams. The light beams emitted by the first optical-electric element 60 are condensed by the first light condensing lens 602, and are directed onto the first reflecting surface 811 through the third light condensing lens 813. The first reflecting surface 811 bends the light beams 90 degrees, so that the light beams enter into the planar optical waveguide 80. As such, the light beams are finally transmitted into another optical communication device (not shown) by the planar optical waveguide 80. A process of the second optical-electric element 70 receiving light is the reverse of that of the first optical-electric element 60 emitting light.

In other embodiments, all of the first light condensing lens 602, the second light condensing lens 702, the third light condensing lens 713, and the fourth light condensing lens 814 can be omitted if the light is not required to be condensed.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical communication device, comprising:
a first substrate;
a first optical-electric element and a second optical-electric element, both the first optical-electric element and the second optical-electric element positioned on the first substrate, the first optical-electric element comprising a light emitting surface, the second optical-electric element comprising a light receiving surface;
a planar optical waveguide comprising a first reflecting surface and a second reflecting surface; and
a fixing device comprising a fixing pole and a fixing ring, the fixing pole defining a through hole, wherein the planar optical waveguide runs through the through hole and is coiled by the fixing ring, the fixing ring is fixed on the fixing pole, to fix the planar optical waveguide to the fixing device, the planar optical waveguide is positioned above the first and the second optical-electric elements, with the first reflecting surface aligning with the light emitting surface, and the second reflecting surface aligning with the light receiving surface.

2. The optical communication device of claim 1, wherein the fixing pole defines two locating holes, the fixing ring comprises two locating posts spatially corresponding to the two locating holes, each of the locating posts is inserted into a respective one of the locating holes to assemble the fixing ring onto the fixing pole, to fix the planar optical waveguide to the fixing device.

3. The optical communication device of claim 1, comprising a second substrate and a third substrate, wherein the first substrate is positioned on the second substrate and the third substrate.

4. The optical communication device of claim 3, wherein the fixing pole defines a receiving cavity receiving an end of the third substrate.

5. The optical communication device of claim 3, comprising a first chip driver, wherein the second substrate comprises a first mounting surface for supporting the first substrate, the first chip driver is mounted on the first mounting surface and is electrically connected to the second optical-electric element.

6. The optical communication device of claim 5, comprises a conductive element, wherein the first substrate comprises a first surface and a second surface facing away from the first surface, the second surface is positioned over the first mounting surface, the second substrate comprises a first connection pad and a second connection pad, both the first connection pad and the second connection pad are formed on the first mounting surface, the first chip driver is electrically connected to the first connection pad and the second connection pad, the first substrate defines a first through hole running through the first surface and the second surface, the first through hole is filled with the conductive element, one end of the conductive element received in the first through hole is electrically connected to the second connection pad, the other end of the conductive element received in the first through hole is electrically connected to the second optical-electric element.

7. The optical communication device of claim 6, wherein the first chip driver is electrically connected to the first connection pad and the second connection pad through a flip chip method.

8. The optical communication device of claim 6, comprising a heat dissipating adhesive, wherein both the first and the second optical-electric elements are positioned on the first surface with the heat dissipating adhesive.

9. The optical communication device of claim 8, wherein the heat dissipating adhesive is a silver adhesive.

10. The optical communication device of claim 6, comprising a second chip driver, wherein the third substrate comprises a second mounting surface for supporting the first substrate, the second chip driver is mounted on the second mounting surface and is electrically connected to the first optical-electric element.

11. The optical communication device of claim 10, wherein the third substrate comprises a third connection pad and a fourth connection pad, both the third connection pad and the fourth connection pad are formed on the second mounting surface, the second chip driver is electrically connected to the first connection pad and the second connection pad, the first substrate defines a second through hole running through the first surface and the second surface, the second through hole is filled with the conductive element, one end of the conductive element received in the second through hole is electrically connected to the third connection pad, the other end of the conductive element received in the second through hole is electrically connected to the first optical-electric element.

12. The optical communication device of claim 11, wherein the second chip driver is electrically connected to the third connection pad and the fourth connection pad through a flip chip method.

13. The optical communication device of claim 1, wherein the first optical-electric element is a laser diode, the first optical-electric element comprises a first light condensing lens formed on the light emitting surface, the planar optical waveguide comprising a bottom surface and a top surface, the bottom surface faces both the first and the second optical-electric elements, the top surface faces away from the bottom surface, the top surface defines a cavity, the cavity comprises a vertical surface substantially perpendicular to the top surface, and the first reflecting surface directly connected to the vertical surface, the first reflecting surface aligns with the first light condensing lens.

14. The optical communication device of claim 13, wherein an included angle between the first reflecting surface and the vertical surface is about 45 degrees, an included angle between the first reflecting surface and the bottom surface is about 45 degrees, an included angle between an optical axis of the first light condensing lens and the first reflecting surface is about 45 degrees.

15. The optical communication device of claim 14, wherein the second optical-electric element is a photo diode, the second optical-electric element comprises a second light condensing lens formed on the light receiving surface, the second reflecting surface aligns with the second light condensing lens.

16. The optical communication device of claim 15, wherein an included angle between an optical axis of the second light condensing lens and the second reflecting surface is about 45 degrees.

17. The optical communication device of claim 15, wherein the bottom surface of the planar optical waveguide forms a third light condensing lens spatially corresponding to the first light condensing lens, and a fourth light condensing lens spatially corresponding to the second light condensing lens.

18. The optical communication device of claim 17, wherein the first, second, third and fourth light condensing lenses are all convex lenses.

* * * * *